United States Patent
Dick (10) Patent No.: US 7,168,727 B2
(45) Date of Patent: Jan. 30, 2007

(54) INVERTIBLE GOOSENECK TRAILER HITCH MECHANISM

(75) Inventor: Bernard L. Dick, Chanute, KS (US)

(73) Assignee: Popup Industries, Inc., Chanute, KS (US)

( * ) Notice: Subject to any disclaimer, the term of this patent is extended or adjusted under 35 U.S.C. 154(b) by 0 days.

(21) Appl. No.: 10/368,777

(22) Filed: Feb. 19, 2003

(65) Prior Publication Data

US 2004/0160037 A1    Aug. 19, 2004

(51) Int. Cl.
B60D 1/52    (2006.01)

(52) U.S. Cl. .............. 280/491.5; 280/511; 280/901

(58) Field of Classification Search ........... 280/491.1, 280/491.5, 491.2, 511, 415.1, 416.1, 495, 280/433, 901; 74/544, 548, 543, 503; 16/405, 16/406, 427, 429; 403/324, 378

See application file for complete search history.

(56) References Cited

U.S. PATENT DOCUMENTS

| | | | |
|---|---|---|---|
| 2,430,418 A * | 11/1947 | Arens | 74/503 |
| 2,877,025 A | 3/1959 | Jay | |
| 3,336,051 A | 8/1967 | Dale | |
| 3,893,713 A | 7/1975 | Ivy | |
| 4,256,324 A | 3/1981 | Hamilton | |
| 4,540,194 A | 9/1985 | Dane | |
| 4,546,994 A | 10/1985 | Taylor | |
| 4,570,966 A | 2/1986 | Giboney et al. | |
| 4,643,043 A * | 2/1987 | Furuta et al. | 74/503 |
| 4,657,274 A | 4/1987 | Mann et al. | |
| 4,889,356 A * | 12/1989 | Morris | 280/416.1 |
| 4,921,266 A | 5/1990 | Beals | |
| 5,016,898 A | 5/1991 | Works et al. | |
| 5,104,138 A * | 4/1992 | Allen | 280/433 |
| 5,145,199 A | 9/1992 | Howard | |
| 5,246,244 A | 9/1993 | Colibert | |
| 5,273,255 A * | 12/1993 | Klicek et al. | 251/251 |

(Continued)

FOREIGN PATENT DOCUMENTS

GB    1548991    * 7/1979 ........... 280/511

OTHER PUBLICATIONS

Curt Manufacturing Incorporated, "Heavy Duty Towing", Dec. 9, 2002 CURT Custom Receiver Hitches Application Guide, www.curtmfg.com.
Curt Manufacturing Incorporated, "Quick Goose", Dec. 9, 2002 CURT Custom Receiver Hitches Application Guide, www.curtmfg.com.

Primary Examiner—Anne Marie Boehler
(74) Attorney, Agent, or Firm—Shook, Hardy & Bacon L.L.P.

(57) ABSTRACT

An invertible gooseneck trailer hitch mechanism is provided. A frame supports a housing having an opening therein for receiving a hitch member in an upright use position or in inverted storage position. A base portion of the hitch member has a circumscribing groove therein to permit cooperation with a pin of a retaining assembly. A user may selectively extend or retract the pin from receipt in the groove by rotating a spaced apart handle when the ball is in either the use or storage positions to retain the hitch member in the opening.

16 Claims, 6 Drawing Sheets

U.S. PATENT DOCUMENTS

| | | | |
|---|---|---|---|
| 5,472,222 A | 12/1995 | Marcy | |
| 5,577,751 A * | 11/1996 | Matthews | 280/415.1 |
| 6,409,202 B1 | 6/2002 | Putnam | |
| 6,447,000 B1 * | 9/2002 | Dick et al. | 280/511 |
| 2002/0060443 A1 * | 5/2002 | Fandrich et al. | 280/495 |
| 2003/0042708 A1 * | 3/2003 | Tambornino | 280/491.1 |

* cited by examiner

INVERTIBLE GOOSENECK TRAILER HITCH MECHANISM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to "gooseneck" type trailer hitches for use in the bed of a tow vehicle, such as a pickup truck. More particularly, this invention relates to a gooseneck trailer hitch mechanism that allows a user to store the hitch ball in an inverted position when it is not needed to make the bed of the truck flat and thereby permit the user to make full use of the truck's bed.

The most common method of hooking a trailer to a vehicle for towing is attaching the trailer to a hitch ball that is mounted on or near the vehicle's rear bumper. However, by virtue of their arrangement, bumper pulled trailers have relatively small size and load restrictions. A common method is employed to tow larger trailers the use of a gooseneck trailer with a gooseneck trailer hitch. In a gooseneck trailer hitch arrangement, a hitch ball is mounted in or on the floor of a pickup bed and/or to the truck frame below the bed floor generally over or slightly ahead of the rear axle of the truck. The trailer has a long tongue portion which is curved and takes on the general shape of a goose's neck, thereby deriving its name. As a benefit of having the hitch ball mounted directly over or forward of the rear axle, as opposed to mounted on the bumper, the amount of load placed on the tongue of the trailer can be increased, because the load is passed directly onto the rear axle of the truck, instead of onto the bumper.

While gooseneck hitches of this type have been around for years, a problem associated with this hitching arrangement is that it often requires the presence of an upwardly projected and typically permanently mounted hitch ball in the middle of the floor of the bed. In the majority of the gooseneck hitch arrangements, the hitch ball is coupled with a large metal plate and the entire unit is bolted or welded to the floor of the truck bed and/or to the truck frame below the bed floor in a location which is generally in the center of the bed. This type of arrangement presents a problem in the event a user of the truck desires to lay large, flat sheet goods in the truck's bed. In that situation, the upwardly projecting hitch member does not allow the sheet goods to lay flat in the bed of the truck and can thereby damage the sheet goods. Similarly, if the user of the truck fills the bed with loose material, such as dirt or gravel, and attempts to shovel the loose material out, the upwardly projecting hitch member often interferes with the user's ability to shovel the loose material.

In an effort to solve these problems, several people have devised arrangements where the hitch ball is either completely removable or may be lowered beneath the floor of the bed. In the situation where the hitch ball is removable, a problem arises, however, in that, without a place to immediately store the removed hitch ball, the hitch ball is often misplaced and, eventually, lost. One arrangement that solved these problems has the hitch ball mounted in a pivoting arrangement that permits the hitch ball to be laid or folded down on its side below the bed surface when not in use. Another arrangement that solved these problems is the advent in recent years of a convertible type gooseneck hitch ball that permits the hitch ball to be retracted below the surface of the bed. See, for example, U.S. Pat. No. 6,447,000 to PopUp Industries. These arrangements, however, often require a lot of space under the bed to mount the associated mechanism and are often costly to manufacture. Additionally, these methods do not permit the hitch ball member to rotate during use, a feature that has been found beneficial in some instances.

Therefore, there is a need for a gooseneck trailer hitch mechanism which permits the hitch ball to be easily moved from an upright use position to a position that permits full use of the truck bed while storing the hitch ball in a convenient location. There also is a need for a gooseneck trailer hitch mechanism which is compact in size and which is simple to manufacture. The present invention overcomes the drawbacks of the prior art and fills these and other needs.

BRIEF SUMMARY OF THE INVENTION

In order to overcome the above-stated problems and limitations, and to achieve the noted advantages, there is provided an invertible gooseneck trailer hitch mechanism having a housing with a generally vertical opening therein and a hitch member which is slidably received in the housing in either an upright use position or in inverted storage position. The hitch member has a ball portion and a base portion. The base portion includes a groove in an outer surface thereof that circumscribes the base portion. When the hitch member is in the use position, the groove aligns with a hole in the side of the housing through which a pin of a retaining assembly is slidably received. The pin selectively cooperates with the groove to permit or prevent the hitch member from being removed from the housing.

When a user desires to tow a gooseneck trailer with the hitch mechanism, the hitch member is received in the housing in the upright position and the pin is received in the groove in an extended position. When the user desires to make full use of the bed, the user can remove the hitch member from the housing by moving the pin from its extended position to a retracted position.

The pin is part of a retaining assembly that is coupled with the housing. The retaining assembly includes first and second members that cooperate in a camming fashion and a user engagable rod which extends away from the housing. The pin is biased to its extended position. A user can move the pin from its extended position to the retracted position by rotating the rod. When the pin is in the retracted position, the hitch member may be removed, flipped over, and reinserted in the housing in an inverted storage position. The rod may again be rotated to move the pin from its retracted position back to its extended position where it is again received in the groove and cooperates therewith to retain the hitch member in the housing in its storage position.

BRIEF DESCRIPTION OF THE SEVERAL VIEWS OF THE DRAWING

The features of the invention noted above are explained in more detail with reference to the embodiments illustrated in the attached drawing figures, in which like reference numerals denote like elements, in which FIGS. 1–10 illustrate an embodiment of the present invention, and in which:

DETAILED DESCRIPTION OF THE INVENTION

Figure 1:
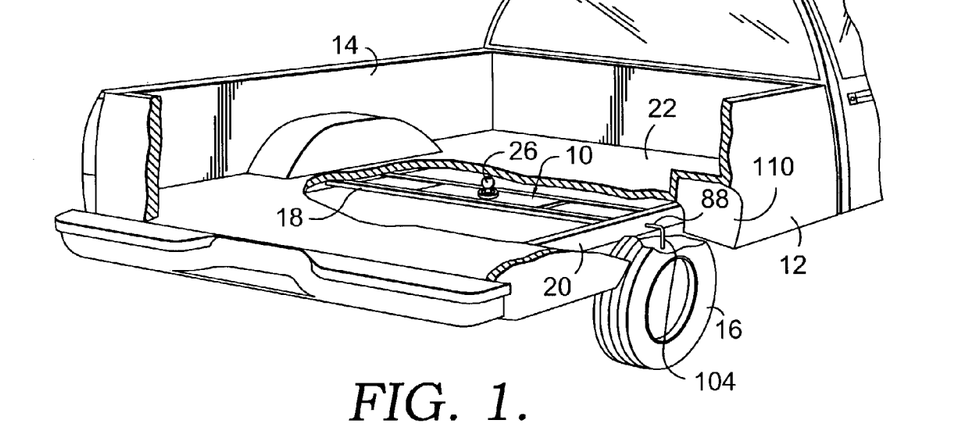
FIG. 1 is a perspective view of an invertible gooseneck hitch ball mechanism constructed in accordance with the present invention and mounted for use in a bed of a pickup truck with a hitch member of the mechanism in an upright use position.

Referring now to the drawings in more detail and initially to FIG. 1, numeral 10 generally designates an invertible gooseneck trailer hitch mechanism constructed in accordance with the present invention. The mechanism 10 is designed to be mounted to a tow vehicle 12, such as the illustrated truck. The mechanism 10 is generally mounted in a bed 14 of the truck 12 adjacent a rear axle (not shown) connecting the vehicle's rear tires 16. The mechanism 10 includes a frame 18 which is attached to a frame 20 of the truck 12. The bed of the truck includes a floor 22.

Figure 2:
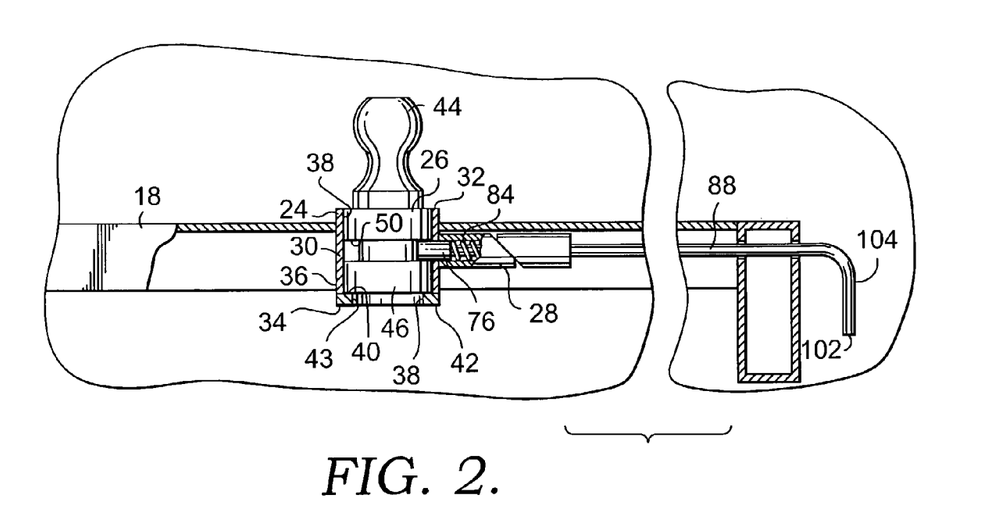
FIG. 2 is a front elevational view of the mechanism with portions thereof cutaway for clarity and with the hitch member secured in the upright use position.

Looking now at FIG. 2, the mechanism 10 further includes a housing 24, a hitch member 26 and a retaining assembly 28.

The housing 24 is generally tubular in nature and, in the embodiment illustrated in the accompanying figures, is more preferably cylindrical in shape. It is, of course, within the scope of the present invention for the housing to have an alternate shape. The housing has a body 30 with an upper surface 32, a lower surface 34 and an outer surface 36 therebetween. The housing 24 is coupled with the frame 18 of the mechanism. This can be accomplished by welding the outer surface 36 of the housing 24 to the frame 18.

The housing 24, being tubular in nature, includes an opening 38 therethrough. The opening 38 is preferably cylindrical in nature. A ledge 40 is provided in the opening 38 adjacent the lower surface 34. The ledge 40 supports the hitch member 26 when it is received in the opening 38 in the housing 24 and prevents the hitch member 26 from falling out a bottom 42 of the housing 24. Preferably, the ledge 40 is an annular ring inside the opening and provides for the opening 38 having a reduced diameter portion 43 adjacent the lower surface 34 of the housing 24 when compared to the diameter of the opening 38 adjacent the upper surface 32 of the housing 24. The benefit of this arrangement will be readily apparent when its cooperation with the hitch member 26 is discussed below.

The housing 24 could be fabricated from a single piece of cylindrical tubing. In such instance, the ledge would be formed by removing additional material in the opening 38 above the desired location of the ledge 40. Alternatively, the ledge can be formed by welding a washer type device to the bottom of a section of tubing.

The hitch member 26 includes a ball portion 44 and a base portion 46. The ball portion 44 is of a shape well known in the art and is of standardized dimensions that are determined by the size of the hitch ball coupler on the trailer that is to receive the ball portion 44 during use.

Figure 9:
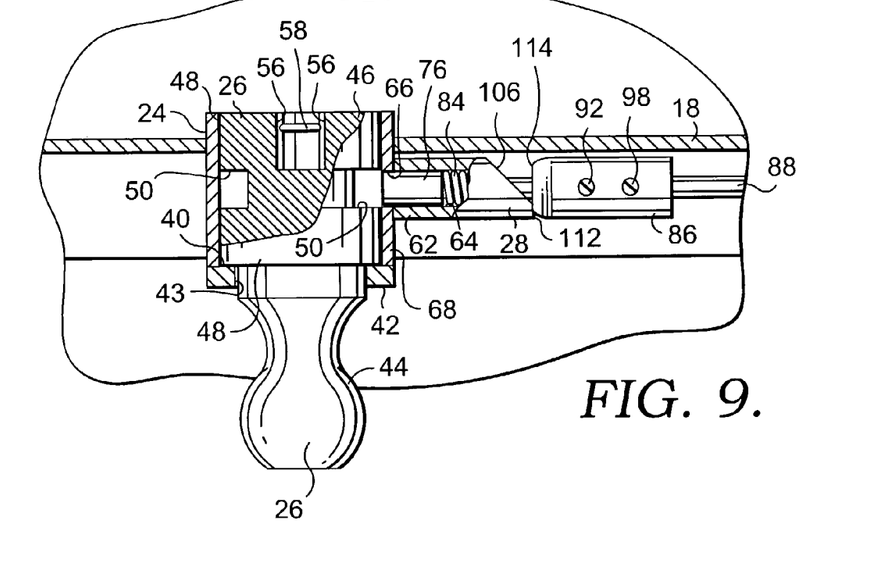
FIG. 9 is an enlarged view of FIG. 6 with additional portions cutaway for clarity.
Figure 10:
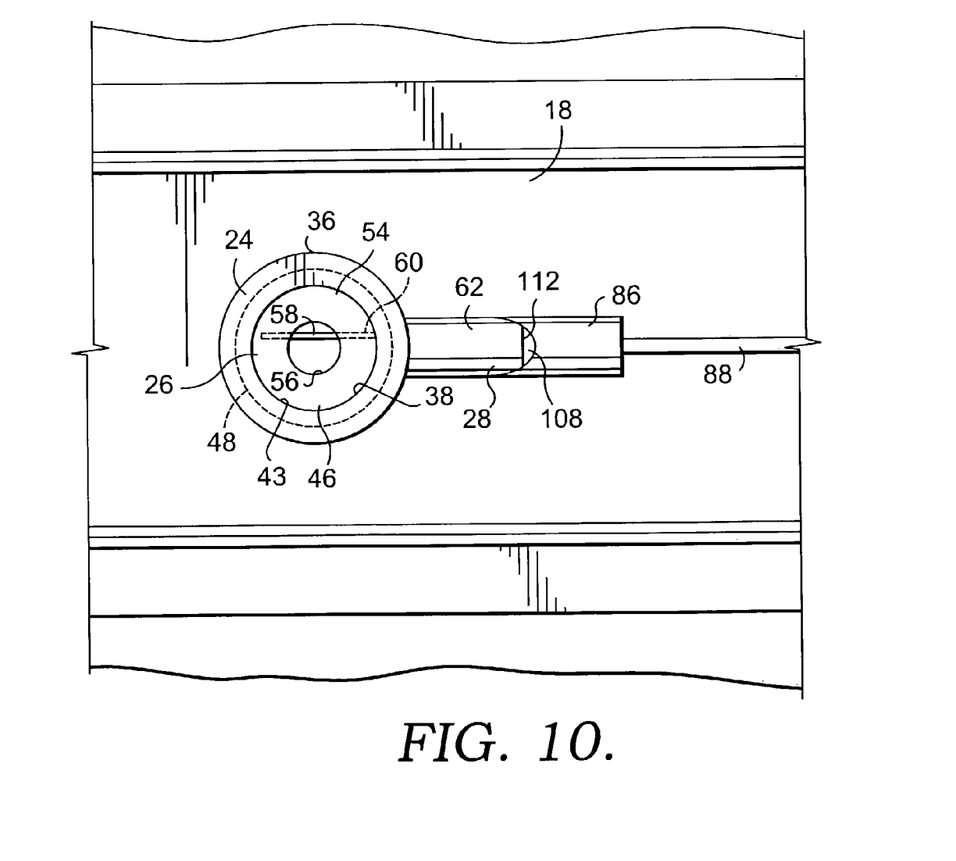
FIG. 10 is a bottom plan view of the mechanism of FIG. 2.

The base portion 46 is preferably a cylindrical member having an outer surface 48 with a groove 50 therein. The groove 50 preferably circumscribes the base portion 46. The base portion 46 has a top surface 52 and a bottom surface 54. Preferably, the groove 50 is equidistant from the top and bottom surfaces 52, 54, for reasons that will be discussed in greater detail below. As best seen in FIGS. 9 and 10, the base portion 46 also includes a hole 56 in its bottom surface 54. A shank 58 passes through the hole 56 in a transverse orientation. The shank 58 can be received in a tunnel 60 bored in the base portion 46 through the outer surface 48.

Figure 11:
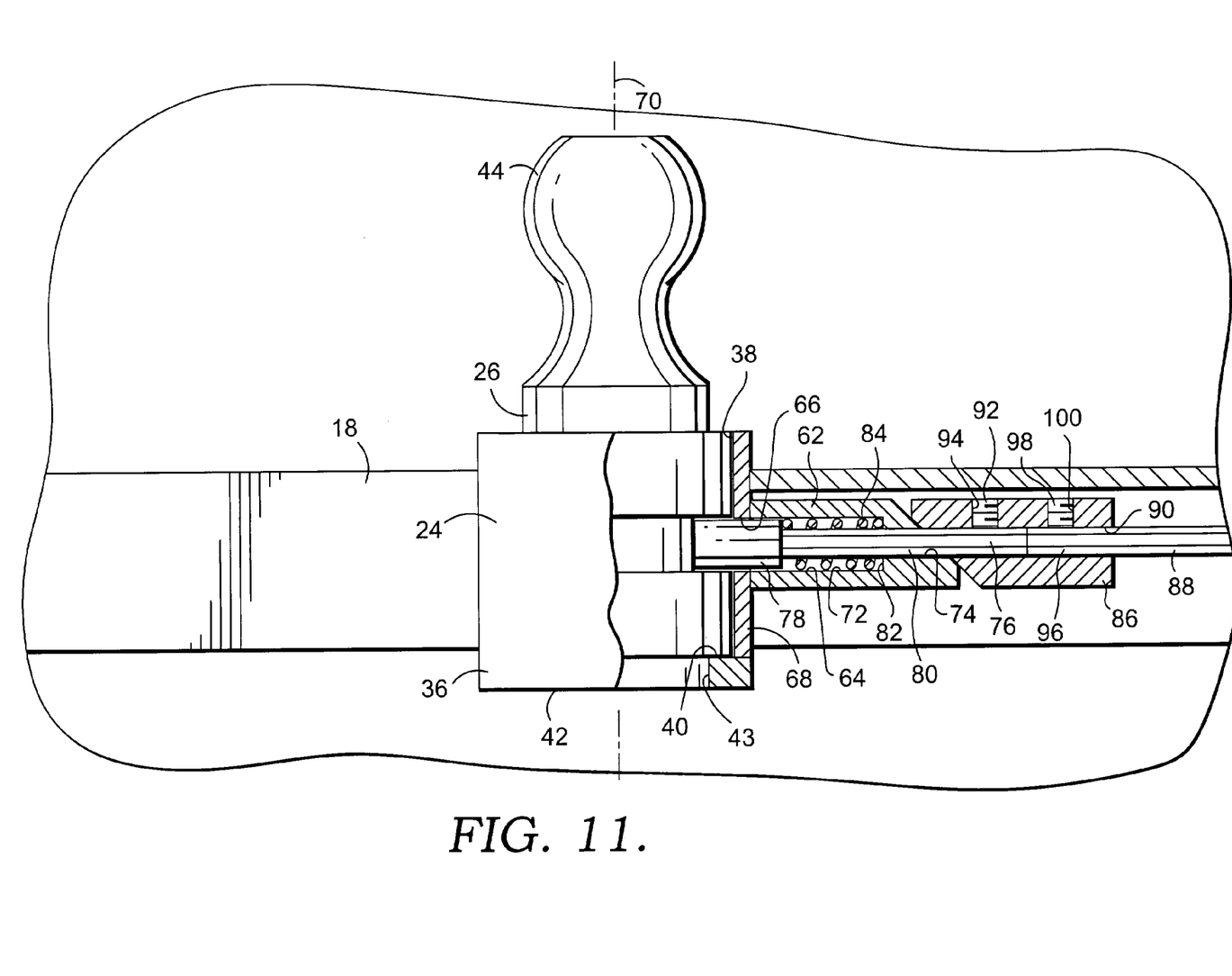
FIG. 11 is the view of FIG. 2 with additional portions cutaway for clarity.

The retaining assembly 28 includes a sleeve 62 having, as best illustrated in FIG. 11, a passage 64 therethrough. The sleeve 62 is coupled with the housing 24 with the passage 64 aligned with a hole 66 in a sidewall 68 of the housing 24. Although not required, the passage 64 is preferably perpendicular to and in radial alignment with a central longitudinal axis 70 of the housing 24. The passage 64 includes first and second areas 72, 74, where the circumference of the first area 72 is larger than the circumference of the second area 74.

The retaining assembly 28 also includes a pin 76 having a first portion 78 and a second portion 80. The first portion 78 of the pin is sized for sliding receipt in the first area 72 of the passage 64 in the sleeve 62 and the second portion 80 of the pin 76 is sized for sliding receipt in the second area 74. The change in the circumference of the passage 64 between the first area 72 and the second area 74 creates an end wall 82 in the passage 64 of the sleeve 62 similar to the ledge 40 in the opening 38 of the housing 24.

A spring 84 is received on the second portion 80 of the pin 76 and is encased in the sleeve 62 in the first area 72 when the pin 76 is received in the passage 64 of the sleeve 62. With the passage 64 aligned with the hole 66 in the side wall 68 of the housing 24, the first portion 78 of the pin 76 is free to pass through the hole 66 in the housing 24 and into the opening 38 in an extended position, as illustrated in FIGS. 2, 7, 8 and 11. As the spring 84 is in the first area 72 intermediate the first portion 78 and the end wall 82, when the pin 76 is moved to a retracted position, as illustrated in FIGS. 4–6 and 9, it is compressed.

The retaining assembly 28 also preferably includes a coupler 86 and a user engagable rod 88. The coupler 86 has a through bore 90 which receives a portion of the second portion 80 of the pin 76. A set screw 92 is received in a first internally threaded bore 94 to attach the coupler 86 to the pin 76. A proximal end 96 of the rod 88 is also received in the through bore 90 of the coupler 86, preferably in an end to end abutting relationship with the pin 76. A second set screw 98 is threadably received in a second internally threaded bore 100 to couple the rod 88 with the coupler 86. As best illustrated in FIGS. 1 and 2, a distal end 102 of the rod 88 has a user engagable handle 104. The sleeve 62 and the coupler 86 both have sloped surfaces 106, 108 respectively.

The hitch member 26 is designed to be selectively slidably received in the housing 24 in either an upright use position, as illustrated in FIGS. 1–5, 10 and 11, or an inverted storage position, illustrated in FIGS. 6–9. The housing 24 is coupled with the mechanism's frame 18 and in turn the mechanism's frame 18 is coupled with the vehicle's frame 20 in a manner that permits the ball portion 44 of the hitch member 26 to project up above the floor 22 of the bed 14 of the truck 12 when the hitch member 26 is received in the housing 24 in the upright use position. Similarly, when the hitch member 26 is received in the housing 24 in the inverted storage position, the bottom surface 54 of the base portion 46 of the hitch member 26 is generally flush with the floor 22 of the bed 14 of the truck 12.

Figure 3:
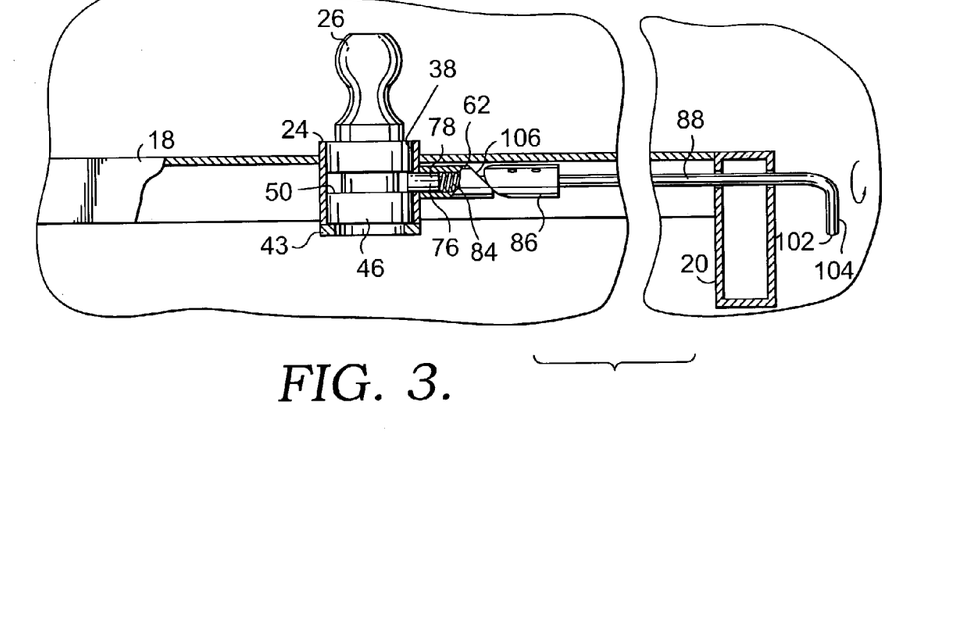
FIG. 3 is the view of FIG. 2 with a retaining assembly being activated to move a pin from an extended position illustrated in FIG. 2 to a retracted position illustrated in FIG. 4.
Figure 4:
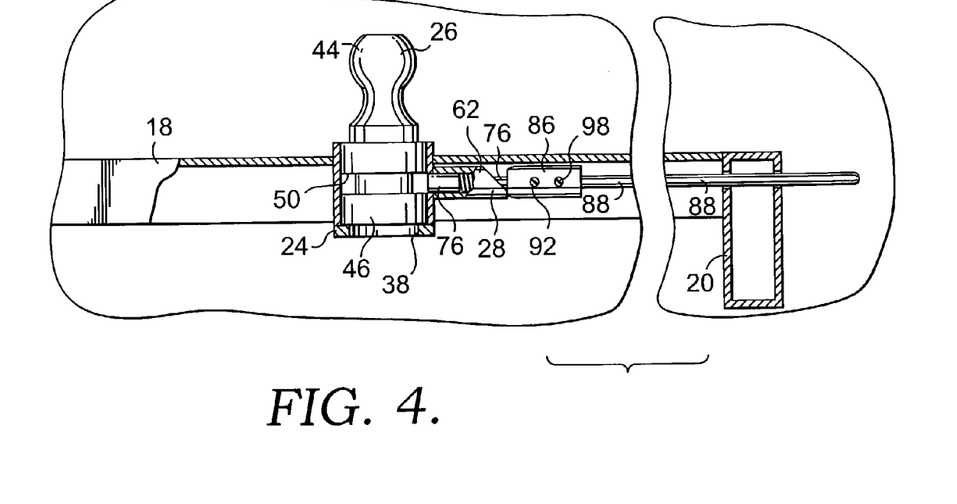
FIG. 4 is the view of FIG. 2 with the pin in the retracted position to permit removal of the hitch member from a housing.

FIG. 2 illustrates the hitch member 46 received in the housing 24 in the use position. The pin 76 is biased into the groove 50 by the spring 84 to prevent the hitch member 26 from being removed from receipt in the opening 38 of the housing 24. A portion of the rod 88 passes through a passage in the vehicle's frame 20 such that the handle 104 of the retaining assembly 28 is accessible by a user in a wheel well 110 (FIG. 1) of the vehicle 12. In FIG. 2, with the pin 76 in its extended position, the sloped surface 108 of the coupler 86 is biased towards and abuts the sloped surface 106 of the sleeve 62 by virtue of the spring 84. As a user rotates the rod 88 via the handle 104, the sloped surfaces 106, 108 cooperate with one another in a camming fashion to remove the first portion 78 of the pin 76 from receipt in the groove 50 in the hitch member 26, as illustrated in FIGS. 3 and 4. Though not critical, by virtue of its design, rotation of the handle 104 90° moves the pin from its extended position in FIG. 2 to its retracted position in FIG. 4.

Figure 5:
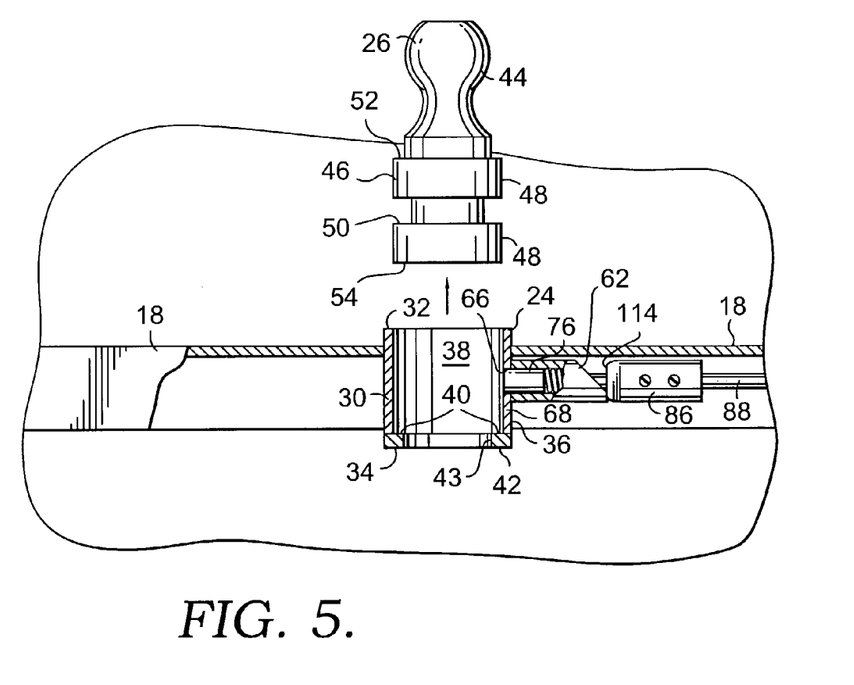
FIG. 5 is the view of FIG. 2 with the hitch member being removed from the housing.
Figure 6:
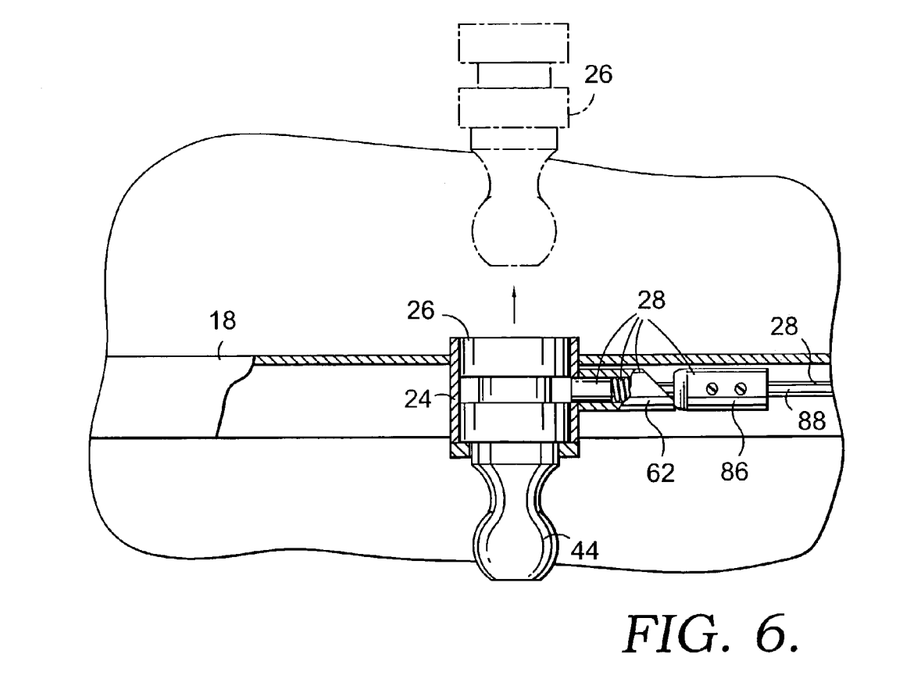
FIG. 6 is the view of FIG. 2 with the hitch member being reinserted in the housing in an inverted storage position.

The sloped surfaces 106, 108 of the sleeve 62 and the coupler 86 terminate in flattened portions 112, 114 respectively. When the pin 76 is in its extended position, as illustrated in FIG. 2, the flattened portions 112, 114 are generally parallel to and opposite one another. However, as the rod 88 is rotated, the flattened portion 114 of the coupler 86 is moved toward the flattened portion 112 of the sleeve 62 until they abut one another when the pin 26 is in its retracted position, as illustrated in FIG. 4. When the flattened portions 112, 114 abut one another, the coupler 86 cooperates with the sleeve 62 to hold the pin 76 in its retracted position. This permits a user to climb into the bed 14 of the truck 12 and remove the hitch member 26 from receipt in the opening 38 of the housing 24 by grasping the ball portion 44 and lifting the hitch member 26 straight up, as illustrated in FIG. 5.

Figure 7:
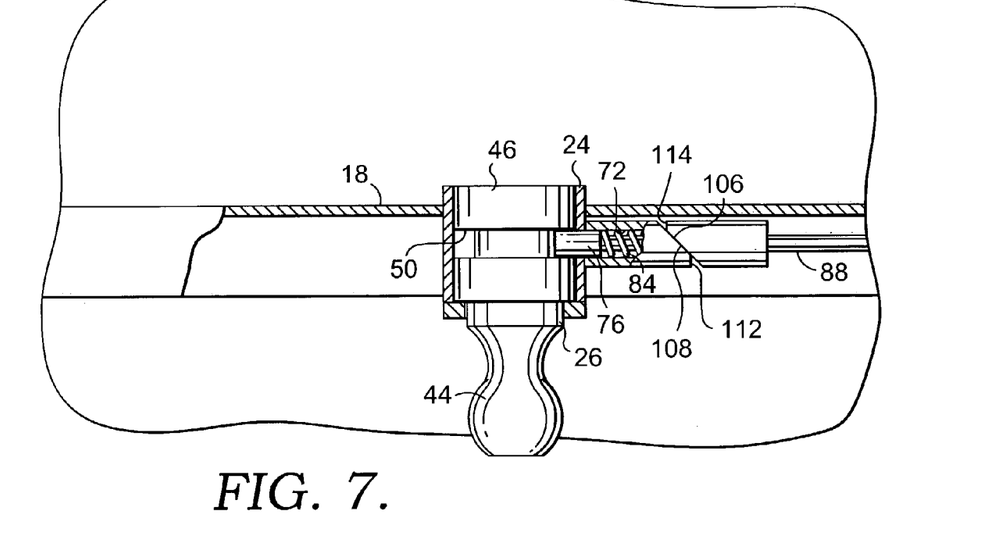
FIG. 7 is the view of FIG. 2 with the hitch member secured in the inverted storage position.
Figure 8:
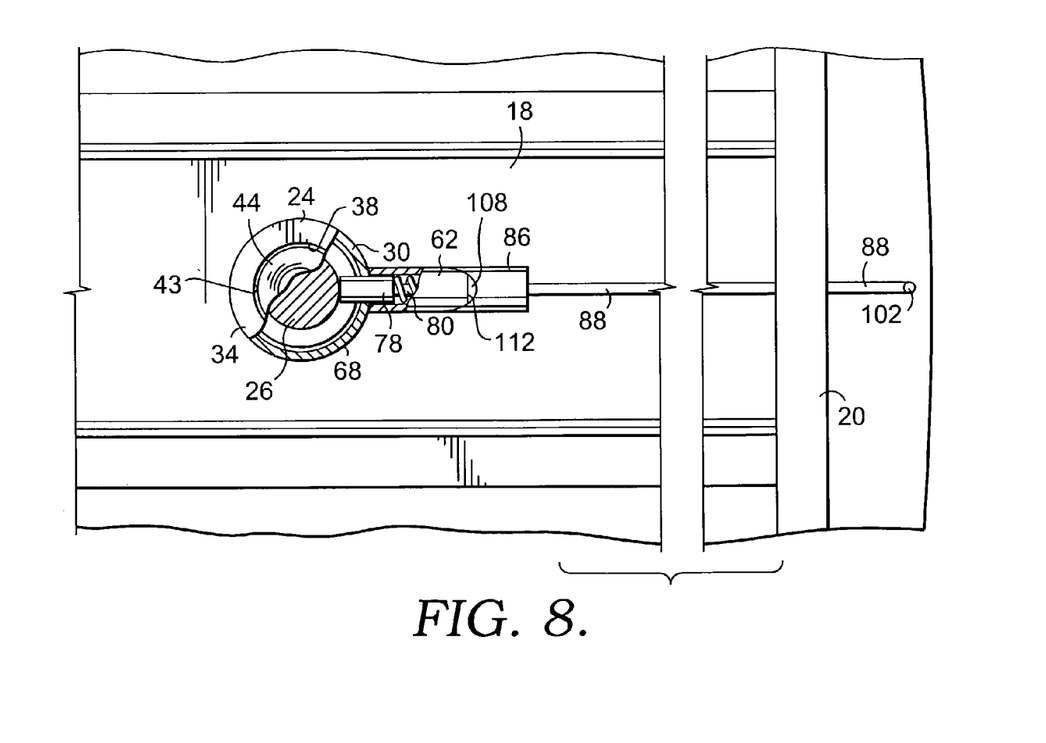
FIG. 8 is a bottom plan view of the mechanism of FIG. 7 with portions cutaway for clarity.

The user may then flip the hitch member 26 end for end, reinsert the hitch member 26 back in the housing 24 in its inverted storage position (see FIG. 6), climb out of the truck and rotate the handle 104 back to its original position, thereby reinserting the pin 76 in the groove 50 in the base portion 46 of the hitch member 26 to again secure the hitch member 26 in the housing 24 (see FIGS. 7 and 8).

To return the hitch member 26 to its use position, the user simply rotates the handle 104 back to the position where the pin 76 is in its retracted position, sticks their finger or a tool down in the hole 56 in the bottom surface 54 of the hitch member 26 and removes the hitch member 26 from the housing 24 by pulling up on the shank 58. The hitch member can then be flipped back over and dropped back down into the opening 38 in the housing 24.

Many variations on the illustrated embodiment of the present invention can be made without departing from the scope of the present invention. Such modifications are within the scope of the present invention. For example, while the embodiment illustrated in the accompanying drawings discloses the housing, its opening, the base member, the sleeve, its passage, the pin, the coupler, its through bore and the rod as being cylindrical or formed from cylindrical stock, non-cylindrical items could be used. However, the use of cylindrical components has been found beneficial for several reasons, including ease of manufacturing. Additionally, the use of a cylindrical opening 38 coupled with a cylindrical base portion 46 with a circumscribing groove 50 permits the hitch member 26 to rotate in the housing 24 about the central longitudinal axis 70 during use. This has been found beneficial to reduce wear on the ball portion 44 and the trailer coupler and to prevent a locking up therebetween. Additionally, by centering the groove 50 between the top and bottom surfaces 52, 54 of the base portion 46, the retaining assembly 28 can be used to hold the hitch member 26 in the housing 24 in both the upright and inverted positions.

Also, while the retaining assembly 28 discloses a retractable pin 76, any arrangement that selectively cooperates with the groove 50 to retain the hitch member 26 in the housing 24 will suffice. For example, the pin could be securely mounted and the hitch member slide sideways to receive the pin in the groove. A block could then be used to hold the hitch member in cooperation with the pin. Further, the pin need not be biased. The pin could be pushed through the hole 66 and wedged in place. Similarly, it is within the scope of the present invention that the illustrated embodiment of the retaining assembly 28 could be used with a different hitch member 26, say one with a bore instead of a groove, without departing from the scope of the invention.

Additionally, it is readily understood by one of ordinary skill in the art that, while the housing 24 as illustrated has an opening 38 therethrough, the side wall 68 of the housing 24 could be extended downwardly passed the ledge 40 a sufficient distance to permit the bottom 42 of the housing to be enclosed. Similarly, while the ledge 40 is illustrated as being annular, it should be readily understood that such is not necessary and the ledge 40 can be sectioned provided the ball portion 44 is still permitted to pass thereby to permit the top surface 52 of the ball portion 44 to rest on ledge 40 when the ball is in its inverted position to align the groove 50 with the pin 76.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A gooseneck trailer hitch mechanism comprising:
a frame;
a housing coupled with the frame, the housing having a generally cylindrical opening therein;
a hitch member having a generally cylindrical portion thereof which is selectively slidably received within the opening in the housing in an upright position and an inverted position, and wherein the portion of the hitch member includes an annular groove which entirely circumscribes the portion;

a means for retaining the hitch member in the housing in the upright position, wherein the means for retaining the hitch member in the housing in the upright position permits at least a portion of the hitch member to rotate with respect to the housing:

wherein the housing includes a bore therein that communicates with the opening, wherein the means for retaining the hitch member in the housing includes a pin, and wherein the pin is selectively movable between an extended position, where the pin extends into the opening through the bore in the housing, and a retracted position, where the pin does not extend into the opening;

wherein the pin is received in and cooperates with the groove to retain the hitch member in the housing when the hitch member is received in the opening in the upright position and the pin is in the extended position;

wherein the means for retaining the hitch member in the housing in the upright position is also capable of retaining the hitch member in the housing in the inverted position;

wherein the means for retaining the hitch member in the housing further includes a sleeve, and wherein the pin is slidably received in the sleeve;

wherein the pin is biased to the extended position, wherein the means for retaining the hitch member in the housing further includes a rod, and wherein the rod is coupled with the pin, whereby a user of the mechanism can move the pin from the extended position to the retracted position by way of the rod; and wherein the means for retaining the hitch member in the housing further includes a cam member, wherein the cam member is coupled with the rod, wherein the sleeve has a camming surface, wherein the cam member has a camming surface, wherein the camming surfaces abut one another in camming fashion, and wherein rotation of the rod rotates the cam member with respect to the sleeve, causes a camming action between the sleeve and the cam member, and moves the pin between the extended and retracted positions.

2. A gooseneck trailer hitch mechanism comprising:
a housing;
a hitch member at least partially received within the housing and selectively movable between a first position and a second position; and
a retaining assembly coupled with the housing, the retaining assembly having a pin, a first member with a camming surface and a second member with a camming surface, wherein the camming surfaces abut each other in a camming fashion, wherein rotation of the second member with respect to the first member moves the pin between an extended position and a retracted position, and wherein the pin cooperates with the hitch member when it is in the extended position to prevent the hitch member from be removed from receipt within the housing.

3. The mechanism of claim 2, wherein the first member is connected to the housing and has a through bore, wherein a portion of the pin is slidably received in the through bore, wherein the housing has an opening therein for receiving a portion of the hitch member and a bore therein that communicates with the opening, and wherein the through bore of the first member is aligned with the bore in the housing, whereby the through bore of the first member and the bore in the housing cooperate to permit the pin to be moved between its extended and retracted positions.

4. The mechanism of claim 3, wherein the retaining assembly further includes a rod having a user engagable end, wherein the second member is coupled with the rod, and wherein a user can rotate the second member with respect to the first member via the rod, whereby the pin is moved between its extended and retracted positions.

5. The mechanism of claim 4, wherein the second member is coupled with the pin, and wherein the pin is biased to its extended position.

6. The mechanism of claim 2, wherein the hitch member has a ball portion and a base portion, wherein the base portion has an upper surface adjacent the ball portion, a lower surface opposite the upper surface, and groove in an outer surface thereof, and wherein the groove circumscribes the base portion.

7. The mechanism of claim 6, wherein the first position is an upright use position and the second position is an inverted storage position, wherein the base portion of the hitch member is at least partially selectively received within the housing, and wherein the groove is equidistant from the upper and lower surfaces, whereby the pin cooperates with the groove to retain the hitch member in the housing when the hitch member is in the use position and when the hitch member is in the storage position.

8. The mechanism of claim 2, wherein the pin is biased to its extended position, wherein the first and second members each have a ledge adjacent their respective camming surfaces, wherein the second member is rotatable with respect to the first member to a position where the ledges abut one another, and wherein the pin is in its retracted position when the ledges abut one another, whereby the ledges cooperate to maintain the pin in its retracted position until they are moved from abutting contact.

9. The mechanism of claim 8, wherein rotation of the second member 90° moves the pin from the extended position to the retracted position.

10. The mechanism of claim 2, wherein the pin is biased to its extended position, wherein the pin has a first portion with an outer surface and a second portion with an outer surface, wherein a distance around the outer surface of the first portion is greater than a distance around the outer surface of the second portion.

11. The mechanism of claim 10, wherein the first member is a sleeve having a passage there through, wherein the passage has a first area sized to receive the first portion of the pin and a second area sized to receive the second portion and prevent receipt of the first portion, wherein the sleeve is connected to the housing, and wherein the pin is at least partially slidably received in the passage, whereby the first portion is in the first area and the second portion is in the second area.

12. The mechanism of claim 11, wherein the retaining assembly further includes a spring to bias the pin to its extended position, wherein the spring is received on the second portion of the pin, and wherein the spring is received in the first area and is intermediate the first portion and the second area.

13. The mechanism of claim 12, wherein the housing has an opening therein for receiving a portion of the hitch member and a bore therein that communicates with the opening, and wherein the passage in- the sleeve is aligned with the bore in the housing, whereby the first portion of the pin moves in and out of the first area into the opening when the pin is moved between its extended and retracted positions.

14. A gooseneck trailer hitch mechanism comprising:
a housing;
a hitch member having a ball portion and a base portion, wherein the base portion is generally cylindrical in nature and includes an annular groove therein that completely circumscribes an outer surface of the base portion, and wherein the base portion of the hitch member is at least partially selectively received within the housing and selectively movable between a first position, wherein the ball portion is above the base portion, and a second position, wherein the base portion is above the ball portion; and
a retaining assembly coupled with the housing, wherein the retaining assembly selectively cooperates with the hitch member to prevent the hitch member from being removed from receipt within the housing and permits the hitch member to rotate with respect to the housing during use, wherein the retaining assembly includes a pin, wherein the pin is movable between an extended position and a retracted position, wherein the pin is received in the groove and cooperates therewith to prevent the hitch member from being removed from receipt within the housing when the pin is in the extended position and the base portion of the hitch member is received in the housing, wherein the housing includes a generally cylindrical opening therein for receiving the base portion of the hitch member, wherein the base portion of the hitch member is sized for receipt in the opening, and wherein the opening includes a reduced diameter portion therein adjacent a lower portion of the housing, the reduced diameter portion creating a ledge in the opening upon which the base portion of the hitch member rests when the hitch member is received in the housing.

15. The mechanism of claim 14, wherein the ball portion is sized to pass through the reduced diameter portion when the hitch member is received in the housing in the second position.

16. The mechanism of claim 15, wherein the base portion has an upper surface adjacent the ball portion and a lower surface opposite the upper surface, and wherein the groove is equidistant from the upper and lower surfaces, whereby the pin cooperates with the groove to retain the hitch member in the housing when the hitch member is in the use position and when the hitch member is in the storage position.

* * * * *